United States Patent
Hicks et al.

(10) Patent No.: US 6,829,729 B2
(45) Date of Patent: Dec. 7, 2004

(54) METHOD AND SYSTEM FOR FAULT ISOLATION METHODOLOGY FOR I/O UNRECOVERABLE, UNCORRECTABLE ERROR

(75) Inventors: Raymond Leslie Hicks, Rochester, MN (US); Alongkorn Kitamorn, Austin, TX (US); Sheldon Ray Bailey, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 550 days.

(21) Appl. No.: 09/820,458

(22) Filed: Mar. 29, 2001

(65) Prior Publication Data

US 2002/0144193 A1 Oct. 3, 2002

(51) Int. Cl.[7] ................................. G06F 11/00
(52) U.S. Cl. ..................... 714/30; 714/40; 714/43; 714/44
(58) Field of Search .......................... 714/30, 31, 40, 714/42, 43, 44

(56) References Cited

U.S. PATENT DOCUMENTS

| | | | | |
|---|---|---|---|---|
| 5,193,177 A | * | 3/1993 | Burri | 714/43 |
| 5,619,642 A | * | 4/1997 | Nielson et al. | 714/6 |
| 6,000,040 A | * | 12/1999 | Culley et al. | 714/31 |
| 6,003,144 A | * | 12/1999 | Olarig et al. | 714/42 |
| 6,058,494 A | * | 5/2000 | Gold et al. | 714/42 |
| 6,105,150 A | * | 8/2000 | Noguchi et al. | 714/44 |
| 6,253,250 B1 | * | 6/2001 | Evans et al. | 709/253 |
| 6,574,752 B1 | * | 6/2003 | Ahrens et al. | 714/43 |

* cited by examiner

Primary Examiner—Scott Baderman
Assistant Examiner—Joshua Lohn
(74) Attorney, Agent, or Firm—Sawyer Law Group LLP

(57) ABSTRACT

A method and system for managing uncorrectable data error conditions from an I/O subsystem as the UE passes through a plurality of devices in a central electronic complex (CEC) is disclosed. The method and system comprises detecting a I/O UE by at least one device in the CEC; and providing an SUE-RE (Special Uncorrectable Data Error-Recoverable Error) attention signal by at least one device to a diagnostic system that indicates the I/O UE condition. The method and system further includes analyzing the SUE-RE attention signal by the diagnostic system to produce an error log with a list of failing parts and a record of the log. A method and system in accordance with the present invention provides a new fault isolation methodology and algorithm, which extends the current capability of a service processor runtime diagnostic code (PRD). The method allows for the accurate determination of an error source and provides appropriate service action if and when the system fails to recover from the UE condition. This new methodology allows a more focused determination of error source and appropriate service action if and when the system fails to recover from an I/O UE.

38 Claims, 8 Drawing Sheets

J = chip has serial jtag connection to Service Processor HW
[ ] dotted box indicates remote chip or device inaccessible to SP via jtag
←--→ dotted line indicates connections to and between remote chips & devices

METHOD AND SYSTEM FOR FAULT ISOLATION METHODOLOGY FOR I/O UNRECOVERABLE, UNCORRECTABLE ERROR

CROSS-REFERENCE TO RELATED APPLICATION

The present application is related to co-pending application, Ser. No. 09/820,461 filed Mar. 29, 2001 (Date), entitled "A Method for Managing an Uncorrectable, Unrecoverable Data Error (UE) as the UE Passes Through A Plurality of Devices In a Central Electronics Complex," and assigned to IBM Corporation, Armonk, N.Y.

FIELD OF THE INVENTION

The present invention relates generally to processing systems and more particularly to a fault isolation methodology related to such systems.

BACKGROUND OF THE INVENTION

Conventional computing systems crash when they encounter uncorrectable/unrecoverable data errors (UEs). The impact to the owner of the system can range from being a minor nuisance to severe monetary business losses. Accordingly, a system owner is adversely affected by such system crashes and becomes very dissatisfied by these UEs. Methods to avoid such crashes have both tangible and intangible benefits.

On a conventional multiprocessing computing system platform which includes a service processor, an error classification and processing model is provided whereby the hardware within the central electronic complex notifies a service processor (SP) of conditions requiring processing. An attention signal is provided that informs the SP that such a condition has occurred. The hardware has functions that capture and inform the SP of which type of condition has occurred. In the conventional system there are three (3) possible hardware detected error types:

1. Recovered Error Attention (REA): A hardware detected error condition which the hardware itself recovered from.

2. Special Attention (SA): A hardware detected condition (not necessarily an error) that requires specific unique SP processing actions.

3. Checkstop Attention (CSA): A hardware detected error condition for which hardware caused the system to cease operating (i.e., system crashes).

In this model a given fault or attention condition was designed to be detected and reported from one and only one logical fault source point. A UE in this model was reported as a CSA thereby causing the system hardware to crash immediately. Accordingly, it is desirable to find ways to keep systems functioning as well as possible when UE conditions are encountered. It is also desirable to provide correct fault isolation in a computer system that continues to function while such systems pass the "data with error" through multiple system components on the way to their data destination with various repercussions at each observation point. The present invention addresses such a need.

SUMMARY OF THE INVENTION

A method and system for managing uncorrectable data error conditions from an I/O subsystem as the UE passes through a plurality of devices in a central electronic complex (CEC) is disclosed. The method and system comprises detecting a I/O UE by at least one device in the CEC, and providing an SUE-RE (Special Uncorrectable Data Error-Recoverable Error) attention signal by at least one device to a diagnostic system that indicates the I/O UE condition. The method and system further includes analyzing the SUE-RE attention signal by the diagnostic system to produce an error log with a list of failing parts and a record of the log.

A method and system in accordance with the present invention provides a new fault isolation methodology and algorithm, which extends the current capability of a service processor runtime diagnostic code (PRD). The method allows for the accurate determination of an error source and provides appropriate service action if and when the system fails to recover from the UE condition. This new methodology allows for a more focused determination of error source and for appropriate service action if and when the system fails to recover from an I/O UE.

DETAILED DESCRIPTION

Figure 1:
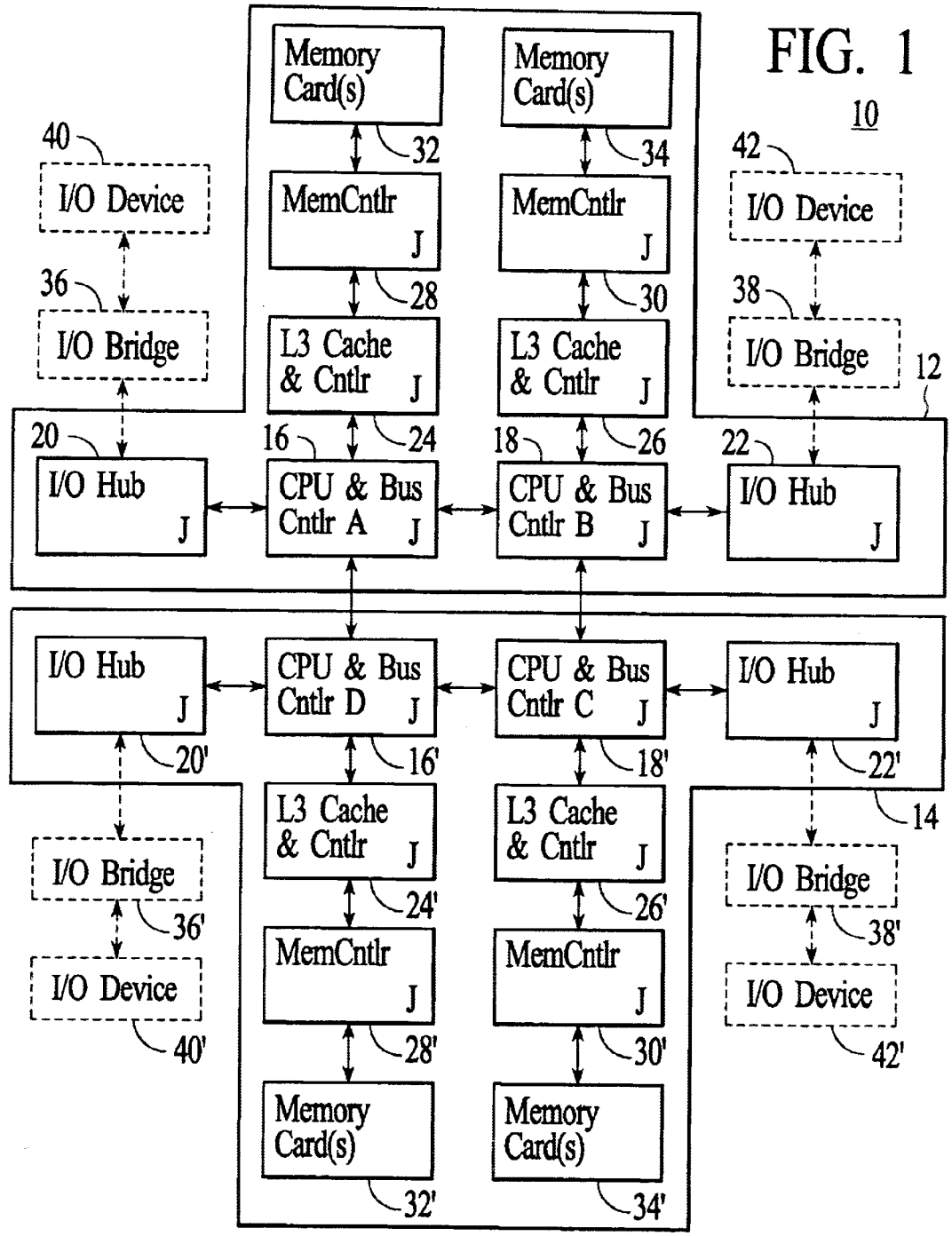
FIG. 1 is a simple block diagram of the main components for a central electronic complex.

The present invention relates generally to processing systems and more particularly to a fault isolation methodology related to such systems. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

U.S. patent application, Serial No. AUS9-2001-0223, entitled "A Method for Managing an Uncorrectable, Unrecoverable Data Error (UE) As the UE Passes Through a Plurality of Devices in a Central Electronics Complex" describes a system and method that allows for managing uncorrectable data errors (UE) as they pass through various points within a computing system from source to destination. In this patent application, a new fault isolation methodology and algorithm which extends the current capability of a service processor routine diagnostic code (PRD) is provided. The method and system in accordance with the above-identified application allows for correct error isolation and for surfacing of appropriate service action messages on a processing system that has successfully recovered from a UE condition. The method and system allows for the accurate determination of an error source and provides appropriate service action if and when the system fails to recover from the UE condition. The above-identified system and method allows for isolation of the error types identified below.

a. Recovered Error Attention (REA): A hardware detected error condition which the hardware itself recovered from.

b. Special Attention (SA): A hardware detected condition (not necessarily an error) that requires specific unique SP processing actions.

c. Checkstop Attention (CSA): A hardware detected error condition for which the hardware caused the system to cease operating (i.e., system crashes)

d. UE-RE: This is attention type raised at the initial detection point of uncorrectable data error. It is closest to actual physical source of error.

e. SUE (Special Uncorrectable Error)-Mask: This category is not a true attention but rather an observation of uncorrectable data passing a point (on path from source to destination) which had been detected and reported closer to the data source and then marked as an SUE and passed along to this observation point. The reason for a mask here is that the error does not necessarily need to be (redundantly) reported from a particular observation point.

f. SUE-Interrupt: This category is not a true attention to the SP but rather an interrupt to the system processor generated in the event the passed error data gets used. This is a hardware mechanism used to invoke system error handling code.

g. SUE-CS: This is an attention to the SP that signifies a particular SUE condition has been detected from which system recovery is not feasible.

The new error conditions (UE-RE, SUE-mask; SUE-Interrupt and SUE-CS) allow fault isolation of detected UE conditions and provide the system with an opportunity to continue operations without crashing. The SP's runtime diagnostic code (known as PRD) processes all of the above seven conditions except the SUE-Interrupt.

The above-identified application, although effective for its intended purposes, cannot isolate unrecoverable uncorrectable errors that originate in an attached I/O subsystem (I/O UE) and get passed into the central electronic complex (CEC) that houses the system CPUs and Mainstore. This type of error presents unique problems to a service processor which can directly interrogate the hardware within a CEC but cannot similarly interrogate device hardware in the attached I/O network where the source of error actually was located. Previous fault isolation schemes were not able to reasonably trace such a fault to its source if it originated in another broader domain (e.g., in one of the multiple I/O subsystems attached to the CEC) that the service processor (and its firmware) does not have any direct physical or logical interrogation connection to.

A method and system in accordance with the present invention addresses this problem. It adds to the above-identified error classification model used for processing recoverable uncorrectable data errors that originated within a domain the service processor could directly interrogate. The system and method in accordance with the present invention has the added benefit of being able to narrow the isolation of fault sources that lie outside of the domain that diagnostic PRD can directly interrogate. In complex systems, earlier PRDs were unable to discern which attached I/O subsystem the failure had been passed in from.

To allow for the correct handling of I/O UEs, the new fault isolation methodology adds an additional new error type classification:

SUE-RE: This category is used to uniquely classify the specific SUEs that are passed into the domain which the PRD processes (e.g., into CEC hardware domain) from some attached domain which the PRD cannot directly interrogate (e.g. an VO subsystem domain). This attention type is not located at the actual point that the error originated (e.g. at some device in one of the attached I/O subsystems). Instead this attention type is located at the first point where such an error becomes visible within the hardware domain that the PRD can interrogate (e.g. in an I/O Interface device within the CEC). It thus allows the PRD to isolate the source domain of the error which is a great aid to service when there are multiple expensive domains attached. The SUE-RE attention notifies the PRD that such an error came in and allows the PRD to make a record that serves as a "smoking gun" clue if a subsequent SUE-CS occurs, crashing the system.

To more particularly describe the features of the present invention, refer now to the following discussion in conjunction with the accompanying figures.

FIG. 1 is a simple block diagram of the main components for a central electronic complex (CEC) 10. Solid lines indicate entities and connections within the central electronics complex. Dotted lines indicate remote entities and connections between them and to the CEC 10. A system and method in accordance with the present invention can be utilized with many types of CEC structures. The structures can be simpler than those which are shown in FIG. 1 or the structures can be more complex. An example of a simple structure could be removing the CPU/bus controller 18, I/O hub 22, L3 cache/controller 26, memory controller 30 and memory card 34 and providing a link to a simple "pass through" connecting component between, and connected to both, the CPU/bus controller 16 and CPU/bus controller 18'. An example of a more complex structure would consist of providing multiple replicates of CEC devices shown in FIG. 1 with the CPU/Bus Controller units in each replicate interconnected with the respective CPU/Bus controller in other replicates. All such configurations are single processing systems which can operate as a single operating system image or as a logically partitioned multiple OS image complex.

Furthermore, although this embodiment of a CEC 10 illustrates one of the possible CEC configurations, one of ordinary skill in the art recognizes that any number of CEC configurations could be utilized therewithin and that would be within the spirit and scope of the present invention.

Each of the CPU/ bus controllers 16, 18, 18' and 16' are connected in communication with their own I/O hubs 20, 22, 22' and 20' respectively. Furthermore, each CPU/ bus controller 16, 18, 18' and 16' is in communication with their respective L3 cache/controllers 24, 26, 26' and 24'. The L3 cache/controllers 24, 26, 26' and 24' in turn are in communication with their respective memory controllers 28, 30, 30' and 28'. The memory controllers 28, 30, 30' and 28' are in turn in communication with memory cards 32, 34, 34' and 32'. The I/O hubs 20, 22, 22' and 20' are also in communication with I/O bridge devices 36, 38, 38' and 36' and I/O devices 40, 42, 42' and 40' which are shown with dotted lines to indicate that they are not part of the overall CEC 10. Each of devices within the CEC includes a JTAG connection indicated by the letter "J" to a service processor (not shown).

Figure 2:
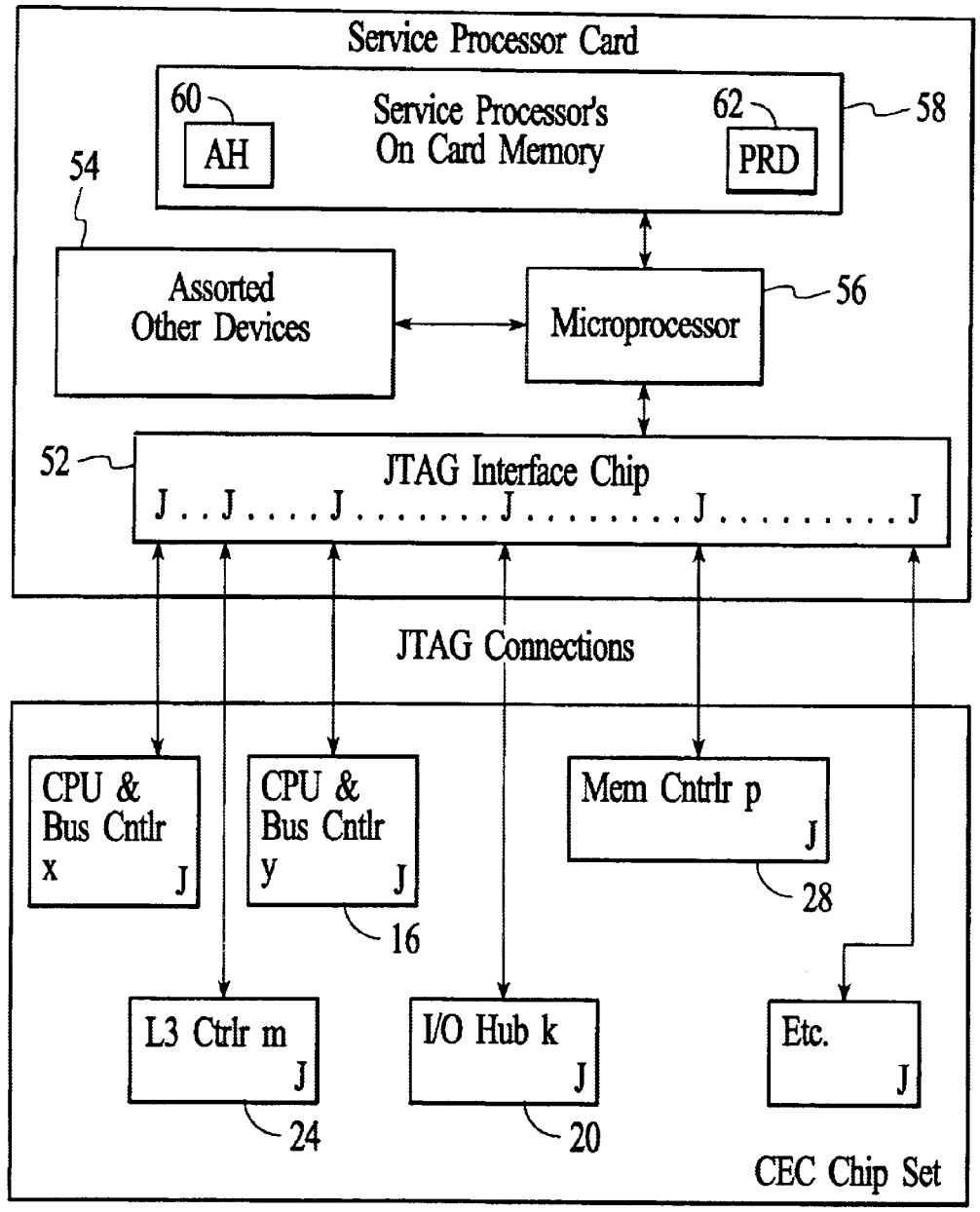
FIG. 2 illustrates a service processor, which has a JTAG interface device therewith which communicates with the various components of the CEC.

FIG. 2 illustrates a service processor 50, which has a JTAG interface device 52 therewith which communicates with the various components of the CEC 10. Each of the devices within the CEC 10 includes an attention line to alert the service processor 50 to a condition requiring service processor action. The attention handler 60 and the service processor runtime diagnostics (PRD) 62 related to that attention handler are firmware components that run on the service processor's microprocessor 56.

A method and system in accordance with the present invention provides a new fault isolation methodology and algorithm, which extends the current capability of the PRD 62. The method allows for the accurate determination of an error source and provides appropriate service action if and when the system fails to recover from the I/O UE condition. To describe the features of the present invention in more detail refer now to the following description in conjunction with the accompanying figures.

Figure 3A:
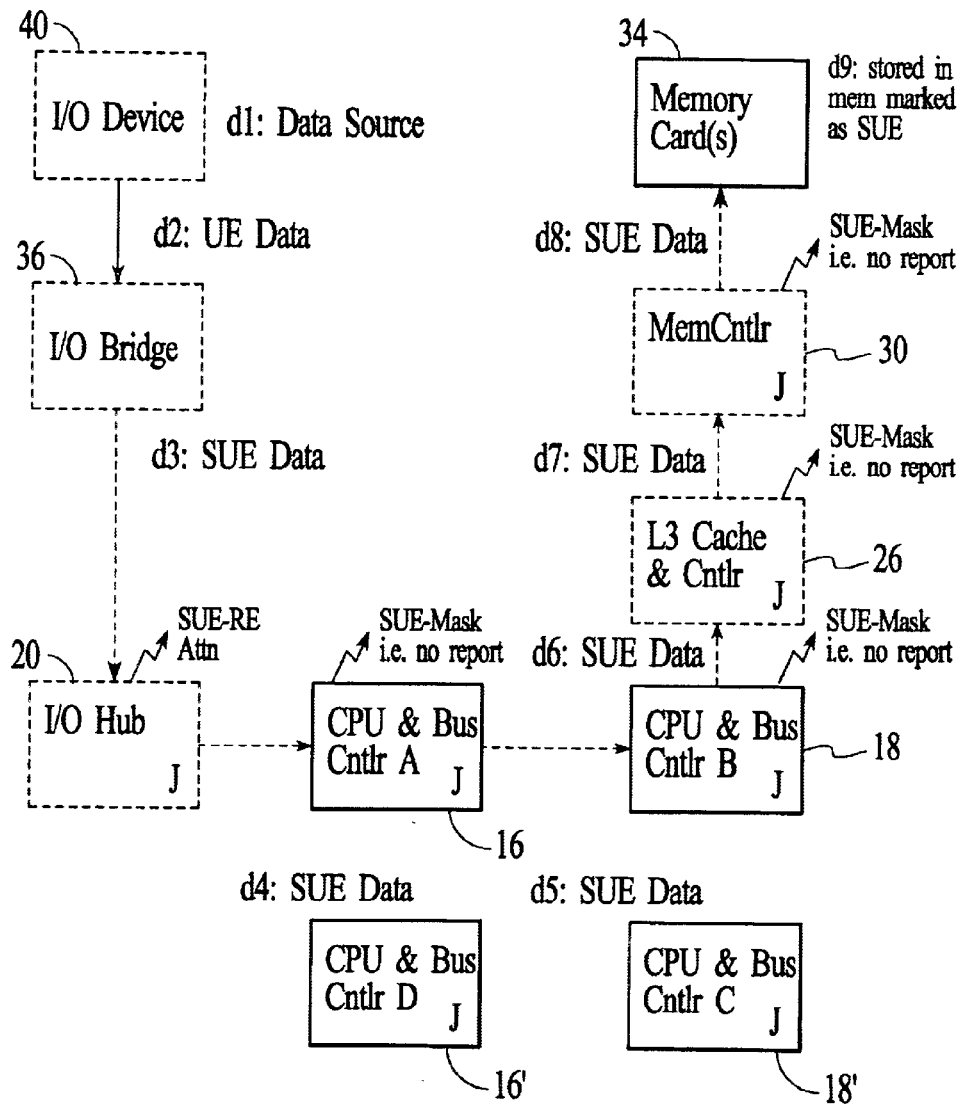
FIG. 3A is a partial view of the CEC and illustrates the flow of the uncorrectable error data from a remote I/O device into the I/O Hub, through various chips within the CEC and stored into the target memory location.

FIG. 3A is a partial view of the CEC 10 and illustrates the flow of the uncorrectable error data from a remote I/O device into the I/O Hub 20, through various chips within the CEC 10 and stored into the target memory location. This figure represents a DMA Write operation. The receiving I/O Hub 20 asserts the Attention signal to alert service processor 50 of the condition. The Attention Handler 60 running on service processor 50 will determine that the PRD 62 needs to be called. The PRD 62 running on service processor 50 will interrogate error registers in the I/O hub via a JTAG serial connection and take appropriate actions which include creating a "SUE-RE Record" for later use if and when a SUE-CS condition occurs. The SUE from a remote device transfers into the CEC 10 as part of a DMA Write into memory. This data is marked/tagged as SUE data and stored in memory as such. The CPU/bus controller 16' later requests and tries to use that data from the memory.

Figure 3B:
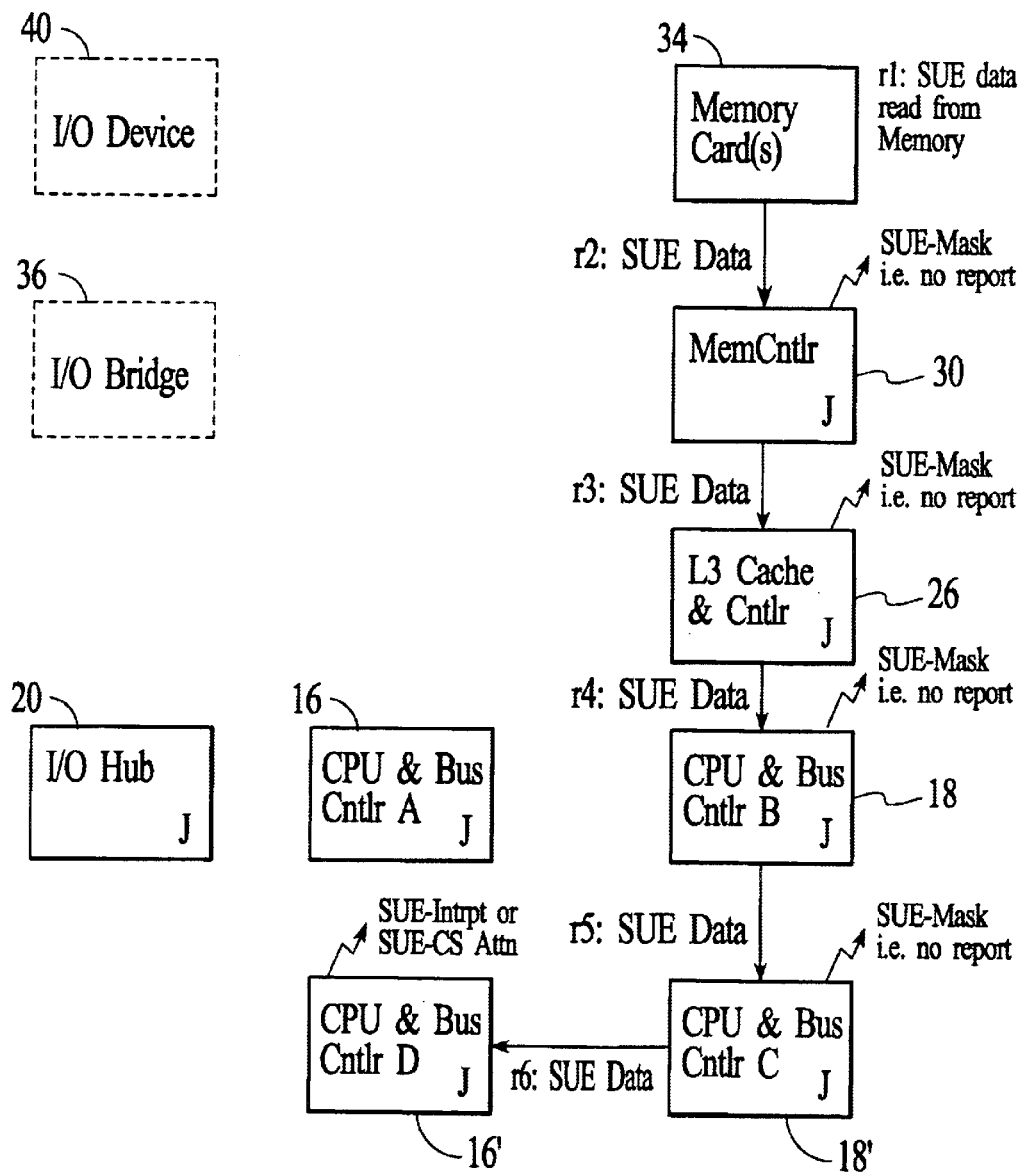
FIG. 3B is a partial view of the CEC and illustrates the flow of the previously stored special uncorrectable error (SUE) data from its memory location, through various devices within the CEC and into the CPU that requested the data (CPU 16' in this example).

A memory read operation by CPU/bus controller 16' is illustrated in FIG. 3B. FIG. 3B is a partial view of the CEC 10 and illustrates the flow of the previously stored special uncorrectable error (SUE) data from its memory location, through various devices within the CEC and into the CPU that requested the data (CPU 16' in this example). This represents the Memory Read operation part.

The CPU/bus controller 16' (which requested the data) signals an interrupt upon its first attempt to use the incoming SUE condition tagged data. It is the responsibility of a system's firmware machine check interrupt handler (not shown) to process that interrupt. In the course of processing this interrupt, the CPU/bus controller 16' may encounter another instance of a special uncorrectable error (SUE) data condition which occurred after the SUE condition currently being processed, which will cause the CPU/bus controller 16' to invoke a system checkstop mechanism (not shown) and will cause the CPU/bus controller 16' to assert a SUE-CS attention to signal.

The attention handler 60 running on the service processor 50 will determine if the PRD 62 needs to be called. The PRD running on the service processor 50 will interrogate error registers in CPU/Bus controller 16' via JTAG serial connection and take appropriate actions.

The PRD 62 provides two significant advantages over conventional PRD processing. The first advantage is that using conventional PRD processing, the initial observation at the receiving I/O hub would not have been reported to and processed by the SP. Secondly, without this PRD processing and the record it produces, the PRD 62 would not be able to process the subsequent resultant SUE-CS conditions.

In the simplest scenarios, SUE-REs either lead to no further reporting (when data is never used) or to SUE-interrupts that get cleanly processed by system error handling code. The PRD processes such SUE-RE conditions in a straightforward way determining and making a record of which domain (e.g. an attached I/O subsystem) the error was passed in from. To illustrate this refer to FIG. 4.

Figure 4:
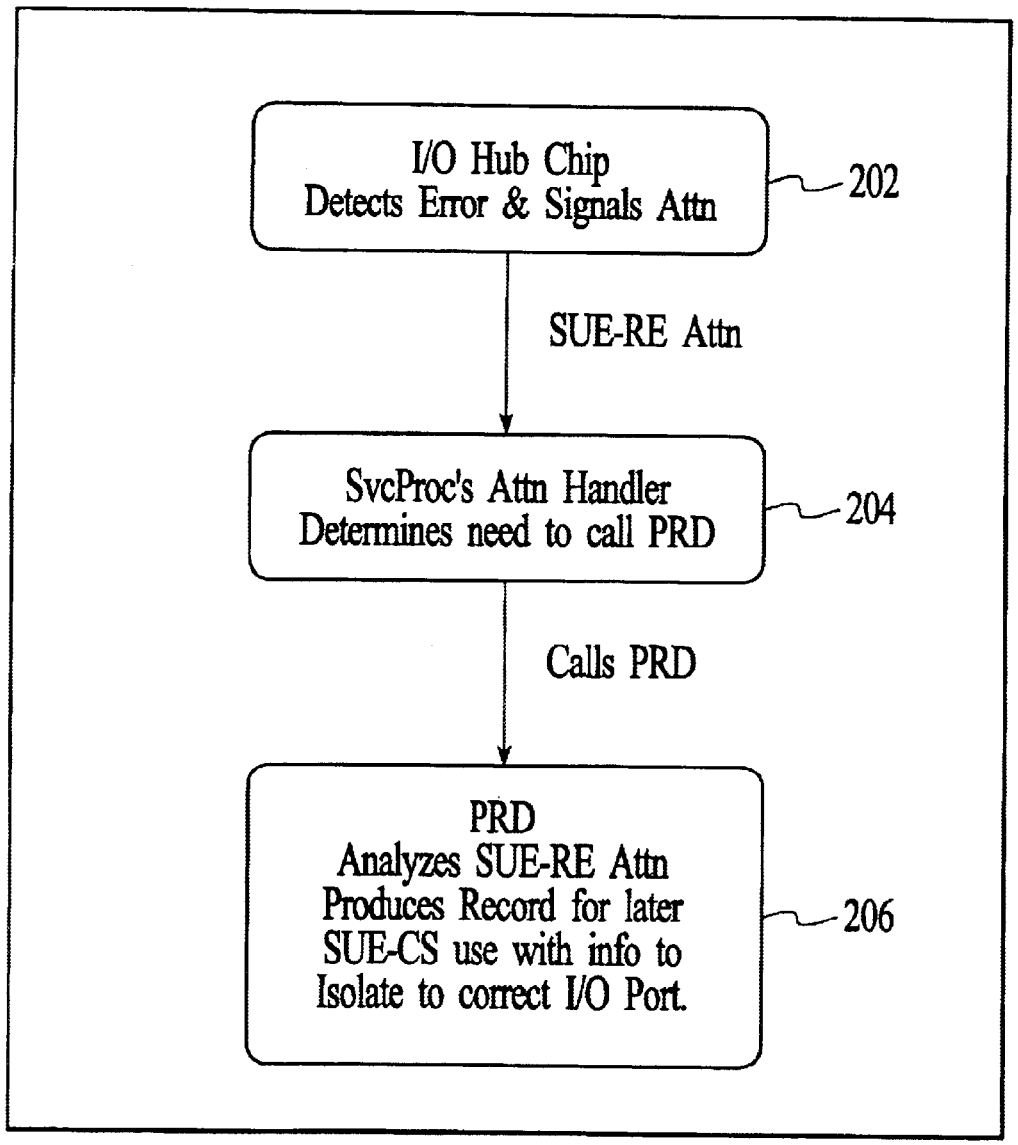
FIG. 4 is a flow chart illustrating how the PRD acts on each reported instance of a SUE-RE condition.

FIG. 4 is a flow chart illustrating how the PRD 62 acts on each reported instance of a SUE-RE condition. As is seen, the I/O hub device 20 detects a SUE condition and provides an attention signal (SUE-RE), via step 202. The attention handler 60 determines that there is a need to call the PRD 62, via step 204. Finally, the PRD 62 analyzes the SUE-RE attention signal and produces a record for later SUE-CS use with information to isolate the SUE-RE to the correct I/O port, via step 206.

The difficulty comes in when there is a more catastrophic scenario that leads to an SUE-CS condition. SUE-CS observation points are inherently distant from the initial source point of the error (i.e., the UE-RE or SUE-RE observation points in the above discussion). There is no way that the PRD can readily discern the source cause of such an error from a simple observation of the SUE-CS itself. To service the system quickly requires just such a determination of the most likely source of such an error.

A preceding UE-RE condition is one likely source of such an SUE-CS condition. A preceding SUE-RE condition (subject of this disclosure) is another possible source of the SUE-CS condition. The PRD effectively correlates SUE-CS conditions to their most likely UE-RE and SUE-RE conditions. The PRD code is then able to surface a more accurate description of what actually caused the SUE-CS condition so that service personnel can more quickly repair the system correctly by replacement of failed components.

Without this new SUE-RE classification model and the diagnostic processing mechanism, the PRD had to call out all attached I/O subsystems as possible fault cause whenever any SUE error propagated in from any I/O complex and this process led to catastrophic SUE-CS system crash. In such a crashed state, direct interrogation of I/O devices is not possible. Also, adding a separate direct diagnostic interrogation connection from the service processor to such devices so that the PRD could access them is cost prohibitive and impractical. The separate connection is especially cost prohibitive and impractical where there can be numerous types of vendor devices used on the system, and such devices are not all under design control of the producer of the system they attach to. The SUE-RE mechanism, therefore, is a very cost effective way to improve on fault isolation in such scenarios. Though it does not provide direct isolation to a single I/O device, it does allow isolation to a single (out of many possible) attached I/O complex. This allows quicker and less expensive system repairs that helps minimize the impact of system outages and improve system owner satisfaction.

The system can usually recover from the SUE-RE condition without experiencing an SUE-CS condition. Such recovery comes by virtue of the CPU/bus controller 16' not trying to utilize the corrupted data, or by virtue of the system's firmware machine check interrupt handler (not shown) being able to complete its error processing of an initial error condition before CPU/bus controller 16' hardware experiences another incoming SUE condition. If such a subsequent SUE condition comes in while such recovery is being attempted, an SUE-CS attention signal will be asserted by the CPU/bus controller 16' device and the system will crash.

Figure 5:
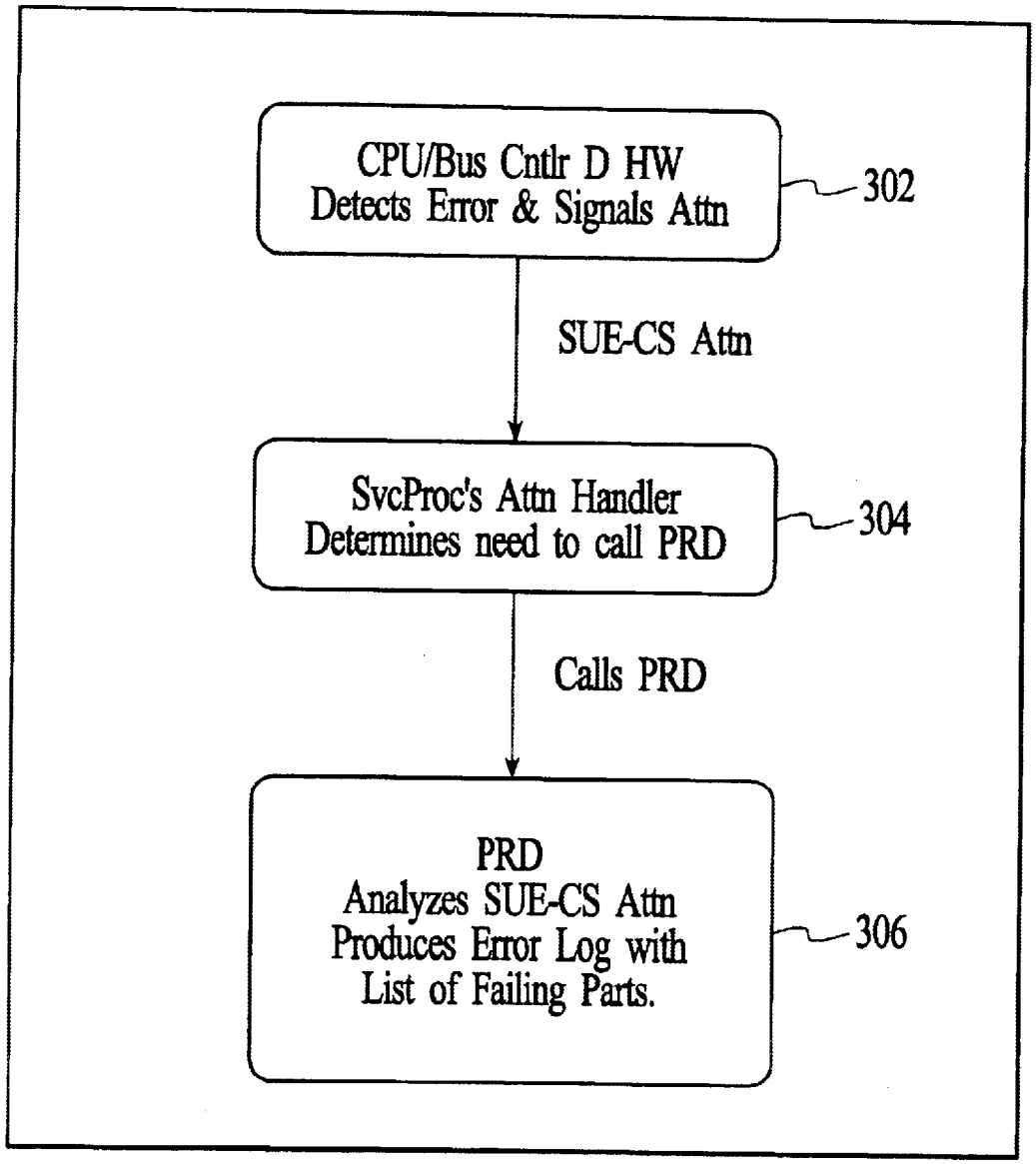
FIG. 5 is a flow chart illustrating how the PRD acts on a reported instance of an SUE-CS condition.

The PRD 62 gets called to process this error case as illustrated in FIG. 5. As is seen, the CPU/bus controller 16' detects an SUE condition and provides an SUE-CS attention signal, via step 302. The attention handler determines that there is a need to call the PRD 62, via step 304. Finally, the PRD 62 analyzes the SUE-CS attention signal and produces an error log with a list of failing parts, via step 306. The flow chart of FIG. 5 seems nearly identical to that of FIG. 4. There is an important difference in the detection of a SUE-CS condition as opposed to the detection of a SUE-RE condition, however. A SUE-RE condition is detected at and reported by the CEC's I/O Hub device which is closest to the I/O source of the error. The I/O Hub device is capable of capturing sufficient data for the PRD 62 to determine the source I/O port of the error.

A SUE-CS condition, on the other hand, is detected and reported by a CEC device which can be far removed both physically and in terms of time from the actual source of the error. In general, such a device is not capable of capturing the error details necessary for the PRD 62 to determine cause. In some cases, a SUE-CS condition also can occur so quickly that there is insufficient time for the PRD 62 to process the prior SUE-RE condition before the SUE-CS attention occurs. Accordingly, the PRD 62 handles these cases by processing the SUE-RE condition at the same time as the subsequent SUE-CS.

Figure 6:
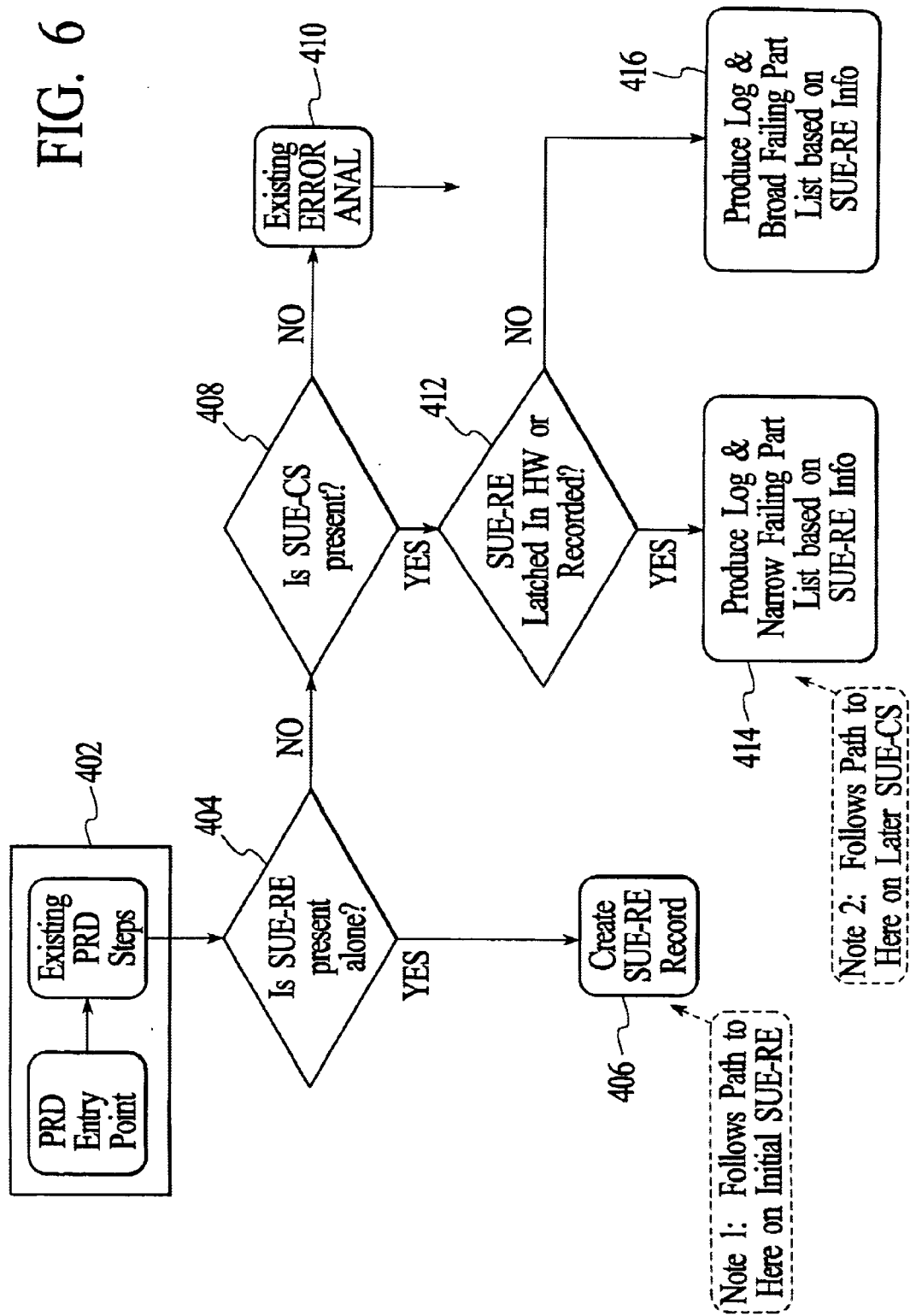
FIG. 6 is a flow chart illustrating the operation of the PRD when the SUE-RE condition and the subsequent SUE-CS condition are processed either consecutively or at the same time.

FIG. 6 is a flow chart illustrating the operation of the PRD 62 when the SUE-RE condition and the subsequent SUE-CS condition are processed either consecutively or at the same time. Referring now to FIG. 6, after the PRD-62 has been initiated via step 402, it is determined if a SUE-RE condition is present alone, via step 404. That is determined if a SUE-RE condition is present and no SUE-CS has occurred. If this condition is satisfied, a SUE-RE record is created, via step 406. If, on the other hand, this condition has not been satisfied, then it is determined if a SUE-CS condition is detected, via step 408. If a SUE-CS condition is not detected, then an existing error analysis is performed, via step 410.

On the other hand, if a SUE-CS condition is detected, it is then determined whether a previous SUE-RE is either recorded or isolated in a hardware CEC device, via step 412. If the answer is yes, then a log is produced in the PRD-62 and a narrow failing part list is produced based on the SUE-RE information, via step 414. If there is no previous SUE-RE condition, then a log is produced and a broad failing parts list is produced based on there being no SUE-RE information, via step 416.

Figure 7:
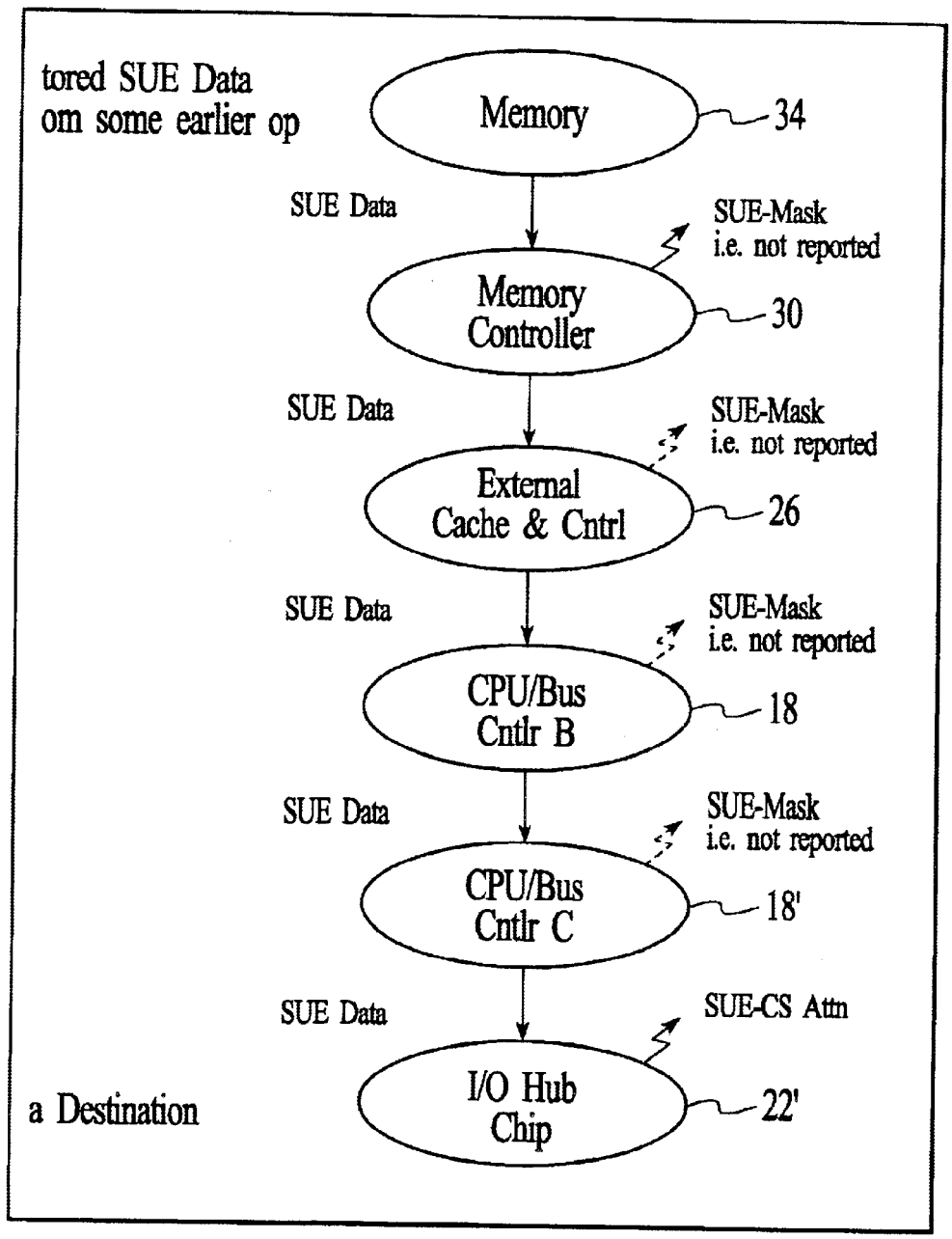
FIG. 7 is a flow chart illustrating the example where an I/O hub device connected to CPU/bus controller requests data marked as a SUE from memory.

FIG. 7 is a flow chart illustrating the example where an I/O hub device 22' connected to CPU/bus controller 18' requests data from memory 34 and memory controller 30 observes a SUE condition on data coming out of memory 34.

Control into and within the PRD 62 works the same for this example as the above-identified example. This example, therefore, illustrates the versatility of the PRD 62 to correctly isolate the cause of the failure to the source I/O port regardless of the path the data travels.

Variations of the above examples are possible and handled in the same fashion. They all have two common characteristics. The first common characteristic is that the original uncorrectable data error begins at some point where a CEC device detects and reports the SUE-RE attention signal. This detection point can be in any 1O hub. The second common characteristic is that either (a) a CPU (can be any one of them) tries to use that error data, or (b) an attempt is made to route that data out to the I/O through any I/O hub. Case (b) always leads to a SUE-CS condition, while case (a) may or may not lead to an SUE-CS condition as described previously.

Accordingly, a method and system in accordance with the present invention provides a methodology which extends the current capability of the PRD. The method and system therefore allows for the accurate determination of an error source and the appropriate service action when the system fails to recover from a particular I/O UE condition. If a SUE-CS occurs, the PRD will correctly resolve the cause of the fault.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for managing an uncorrectable data error (UE), wherein the UE can produce any of the following conditions: a UE-RE condition, an SUE-mask condition, SUE interrupt condition, a SUE-RE condition, and a SUE-CS condition, from an I/O subsystem as the UE passes through a plurality of devices in a central electronic complex (CEC), the method comprises:

(a) detecting an I/O UE condition by at least one device in the CEC;

(b) providing an SUE-RE (Special Uncorrectable Data Error-Recoverable Error) attention signal by the at least one device to a diagnostic system to indicate the I/O UE condition; and (c) analyzing the SUE-RE attention signal by the diagnostic system to produce a record for later use which can isolate the I/O UE condition to the I/O port.

2. The method of claim 1 wherein the SUE-mask condition does not need to be reported.

3. The method of claim 1 wherein detecting (a) comprises:

(a1) detecting a SUE-RE condition by a first device; and (a2) detecting a SUE-CS condition by at least one other device at a later point in time, wherein the SUE-RE condition and the SUE-CS conditions are processed at substantially the same time.

4. The method of claim 1 wherein the diagnostic system comprises a processor runtime diagnostic (PRD) code.

5. The method of claim 4 where in the PRD code is within a service processor.

6. The method of claim 5 wherein the PRD code accesses each of the plurality of devices through an interface within the service processor.

7. The method of claim 6 wherein the interface comprises a JTAG interface.

8. A computer readable medium containing program instructions for managing an uncorrectable data error (UE), wherein the UE can produce any of the following conditions: a UE-RE condition, an SUE-mask condition, SUE interrupt condition, a SUE-RE condition, and a SUE-CS condition from an I/O subsystem as the UE passes through a plurality of devices in a central electronic complex (CEC), the program instructions for:

(a) detecting an I/O UE condition by at least one device in the CEC;

(b) providing an SUE-RE (Special Uncorrectable Data Error-Recoverable Error) attention signal by the at least one device to a diagnostic system to indicate the I/O UE condition; and (c) analyzing the SUE-RE attention signal by the diagnostic system to produce a record for later use which can isolate the I/O UE condition to the I/O port.

9. The computer readable medium of claim 8 wherein the SUE-mask condition does not need to be reported.

10. The computer readable medium of claim 8 wherein detecting (a) comprises:

(a1) detecting a SUE-RE condition by a first device; and (a2) detecting a SUE-CS condition by at least one other device at a later point in time, wherein the SUE-RE condition and the SUE-CS conditions are processed at substantially the same time.

11. The computer readable medium of claim 8 wherein the diagnostic system comprises a processor runtime diagnostic (PRD) code.

12. The computer readable medium of claim 11 where in the PRD code is within a service processor.

13. The computer readable medium of claim 12 wherein the PRD code accesses each of the plurality of devices through an interface within the service processor.

14. The computer readable medium of claim 13 wherein the interface comprises a JTAG interface.

15. A service processor for managing an uncorrectable data error (UE), wherein the UE can produce any of the following condition: a UE-RE condition, an SUE-mask condition, SUE interrupt condition, a SUE-RE condition, and a SUE-CS condition, from an I/O subsystem as the UE passes through a plurality of devices in a central electronic complex (CEC), the service processor comprises:

an attention handler for detecting an I/O UE condition by at least one device in the CEC and providing an SUE-RE (Special Uncorrectable Data Error-Recoverable Error) attention signal by the at least one device to indicate the I/O UE condition; and a diagnostic system for receiving the attention signal and for analyzing the SUE-RE attention signal system to produce a record for later use which can isolate the I/O UE condition to the I/O port.

16. The service processor of claim 15 wherein the SUE-mask condition does not need to be reported.

17. The service processor of claim 15 wherein the attention handler detects a SUE-RE condition by a first device, and detects a SUE-CS condition by at least one other device at a later point in time, wherein the SUE-RE condition and the SUE-CS conditions are processed at substantially the same time.

18. The service processor of claim 15 wherein the diagnostic system comprises a processor runtime diagnostic (PRD) code.

19. The service processor of claim 18 wherein the PRD code accesses each of the plurality of devices through an interface within the service processor.

20. The service processor of claim 19 wherein the interface comprises a JTAG interface.

21. A method for managing an uncorrectable data error (UE) from an I/O subsystem as the UE passes through a plurality of devices in a central electronic complex (CEC), the method comprises:

(a) detecting an I/O UE condition by at least one device in the CEC wherein detecting (a) comprises: (a1) detecting a SUE-RE condition by a first device; and (a2) detecting a SUE-CS condition by the at least one other device at a later point in time, wherein the SUE-RE condition and the SUE-CS conditions are processed at substantially the same time;

(b) providing an SUE-RE (Special Uncorrectable Data Error-Recoverable Error) attention signal by at least one device to a processor runtime diagnostic (PRD) code to indicate the I/O UE condition, wherein the PRD accesses each of the plurality of devices through an interface within the service processor; and (c) analyzing the SUE-RE attention signal by the diagnostic system to produce a record for later use which can isolate the I/O UE condition to the I/O port.

22. The method of claim 21 wherein the UE can produce any of the following conditions: a UE-RE condition; an SUE-mask condition; SUE interrupt condition; a SUE-RE condition and a SUE-CS condition.

23. The method of claim 22 wherein the SUE-mask condition does not need to be reported.

24. The method of claim 23 wherein the PRD code is within a service processor.

25. The method of claim 24 wherein the interface comprises a JTAG interface.

26. A computer readable medium containing program instructions for managing an uncorrectable data error (UE) from an I/O subsystem as the UE passes through a plurality of devices in a central electronic complex (CEC), the method comprises:

(a) detecting an I/O UE condition by at least one device in the CEC wherein detecting (a) comprises: (a1) detecting a SUE-RE condition by a first device; and (a2) detecting a SUE-CS condition by the at least one other device at a later point in time, wherein the SUE-RE condition and the SUE-CS conditions are processed at substantially the same time;

(b) providing an SUE-RE (Special Uncorrectable Data Error-Recoverable Error) attention signal by at least one device to a processor runtime diagnostic (PRD) code to indicate the I/O UE condition, wherein the PRD accesses each of the plurality of devices through an interface within the service processor; and (c) analyzing the SUE-RE attention signal by the diagnostic system to produce a record for later use which can isolate the I/O UE condition to the I/O port.

27. The computer readable medium of claim 26 wherein the UE can produce any of the following conditions: a UE-RE condition; an SUE-mask condition; SUE interrupt condition; and a SUE-CS condition.

28. The computer readable medium of claim 27 wherein the SUE-mask condition does not need to be reported.

29. The computer readable medium of claim 28 wherein the PRD code is within a service processor.

30. The computer readable medium of claim 29 wherein the interface comprises a JTAG interface.

31. A service processor for managing an uncorrectable data error (UE) from an I/O subsystem as the UE passes through a plurality of devices in a central electronic complex (CEC), the service processor comprises:

an attention handler for detecting an I/O UE condition by at least one device in the CEC and providing an SUE-RE (Special Uncorrectable Data Error-Recoverable Error) attention signal by the at least one device to indicate the I/O UE condition wherein the attention handler detects a SUE-RE condition by a first device, and detects a SUE-CS condition by at least one other device at a later point in time, wherein the SUE-RE condition and the SUE-CS conditions are processed at substantially the same time; and a processor runtime diagnostic (PRD) code for receiving the attention signal and for analyzing the SUE-RE attention signal system to produce a record for later use which can isolate the I/O UE condition to the I/O port.

32. The service processor of claim 31 wherein the UE can produce any of the following conditions: a UE-RE condition; an SUE-mask condition; SUE interrupt condition, a SUE-RE condition and a SUE-CS condition.

33. The service processor of claim 32 wherein the SUE-mask condition does not need to be reported.

34. The service processor of claim 33 wherein the PRD code accesses each of the plurality of devices through an interface within the service processor.

35. The service processor of claim 34 wherein the interface comprises a JTAG interface.

36. A method for managing an uncorrectable data error (UE) from an I/O subsystem as the UE passes through a plurality of devices in a central electronic complex (CEC), the method comprises:

(a) detecting an I/O UE condition by at least one device in the CEC, wherein the UE can produce any of the following conditions: a UE-RE condition; an SUE-mask condition; SUE interrupt condition; a SUE-RE condition and a SUE-CS condition;

(b) providing an SUE-RE (Special Uncorrectable Data Error-Recoverable Error) attention signal by the at least one device to a diagnostic system to indicate the I/O UE condition; and (c) analyzing the SUE-RE attention signal by the diagnostic system to produce a record for later use which can isolate the I/O UE condition to the I/O port.

37. A computer readable medium containing program instructions for managing an uncorrectable data error (UE) from an I/O subsystem as the UE passes through a plurality of devices in a central electronic complex (CEC), the program instructions for:

(a) detecting an I/O UE condition by at least one device in the CEC, wherein the UE can produce any of the following conditions: a UE-RE condition; an SUE-mask condition; SUE interrupt condition; a SUE-RE condition; and a SUE-CS condition;

(b) providing an SUE-RE (Special Uncorrectable Data Error-Recoverable Error) attention signal by the at least one device to a diagnostic system to indicate the I/O UE condition; and (c) analyzing the SUE-RE attention signal by the diagnostic system to produce a record for later use which can isolate the I/O UE condition to the I/O port.

38. A service processor for managing an uncorrectable data error (UE) from an I/O subsystem as the UE passes through a plurality of devices in a central electronic complex (CEC), the service processor comprises:

an attention handler for detecting an I/O UE condition by at least one device in the CEC and providing an SUE-RE (Special Uncorrectable Data Error-Recoverable Error) attention signal by the at least one device to indicate the I/O UE condition, wherein the UE can produce any of the following conditions: a UE-RE condition; an SUE-mask condition; SUE interrupt condition, a SUE-RE condition and a SUE-CS condition; and a diagnostic system for receiving the attention signal and for analyzing the SUE-RE attention signal system to produce a record for later use which can isolate the I/O UE condition to the I/O port.

* * * * *